April 21, 1925.  
C. E. STEERE  
1,534,035  
LIQUID MEASURING AND FILLING MACHINE  
Filed Jan. 17, 1918  
3 Sheets-Sheet 1
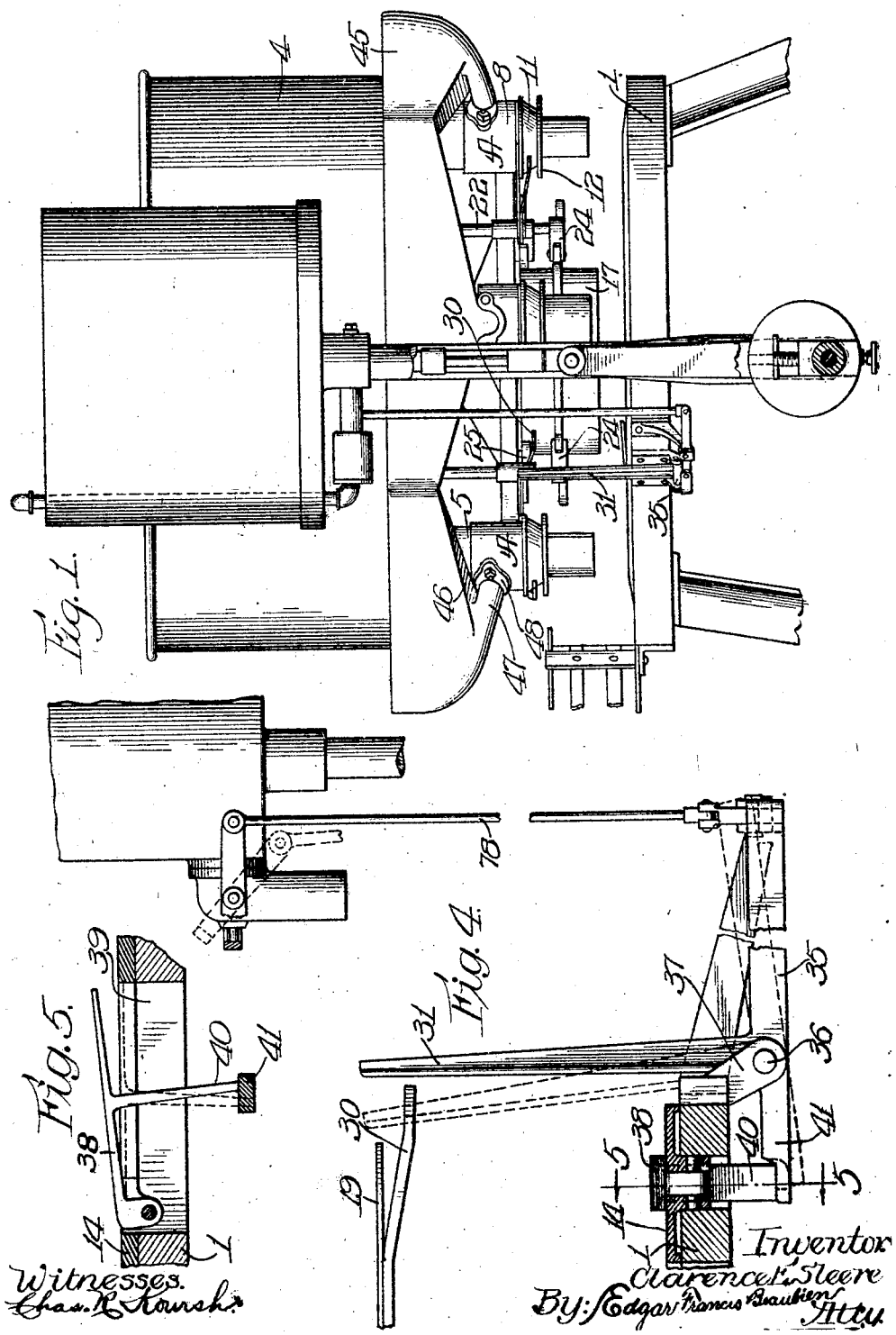

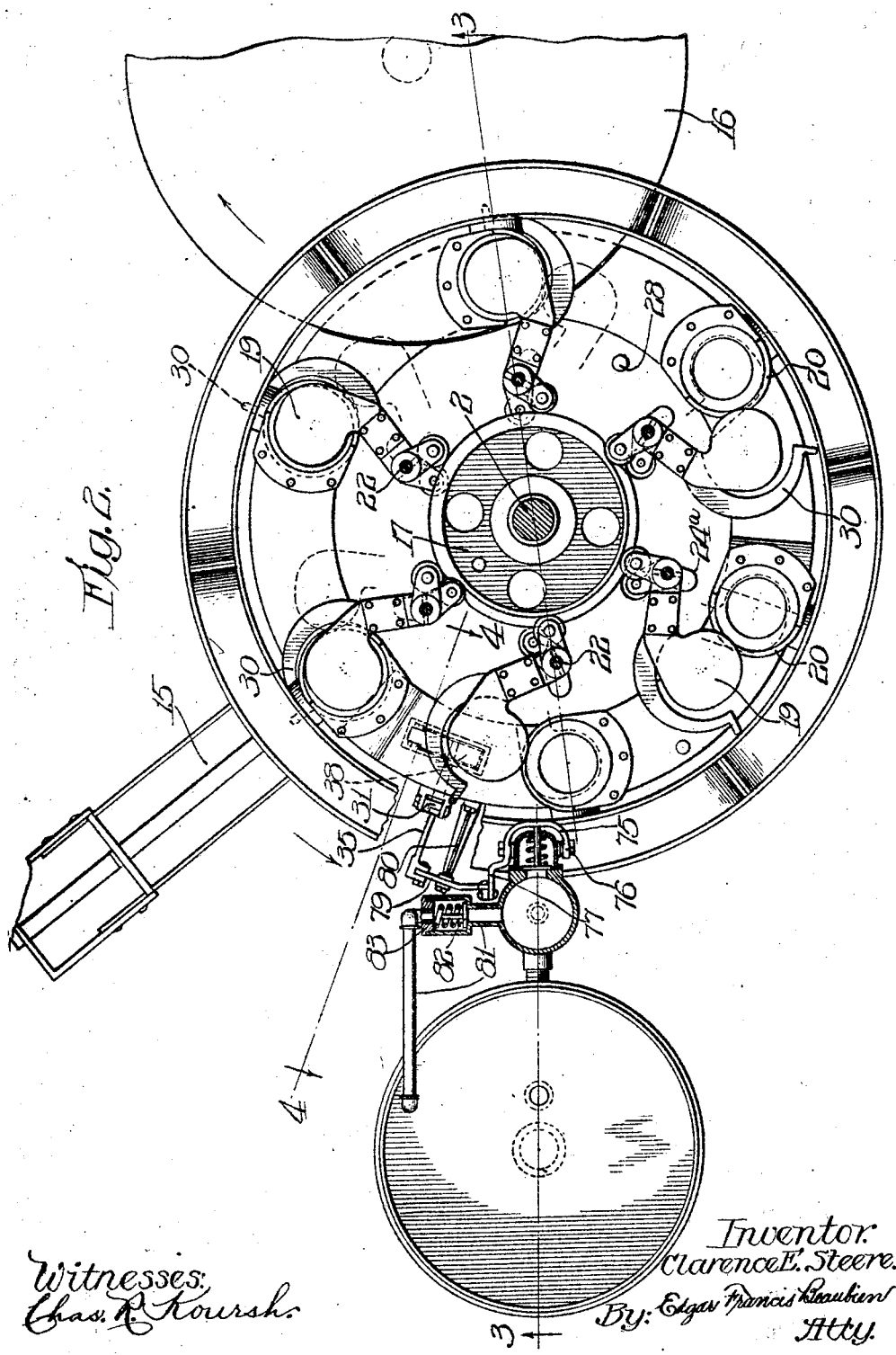

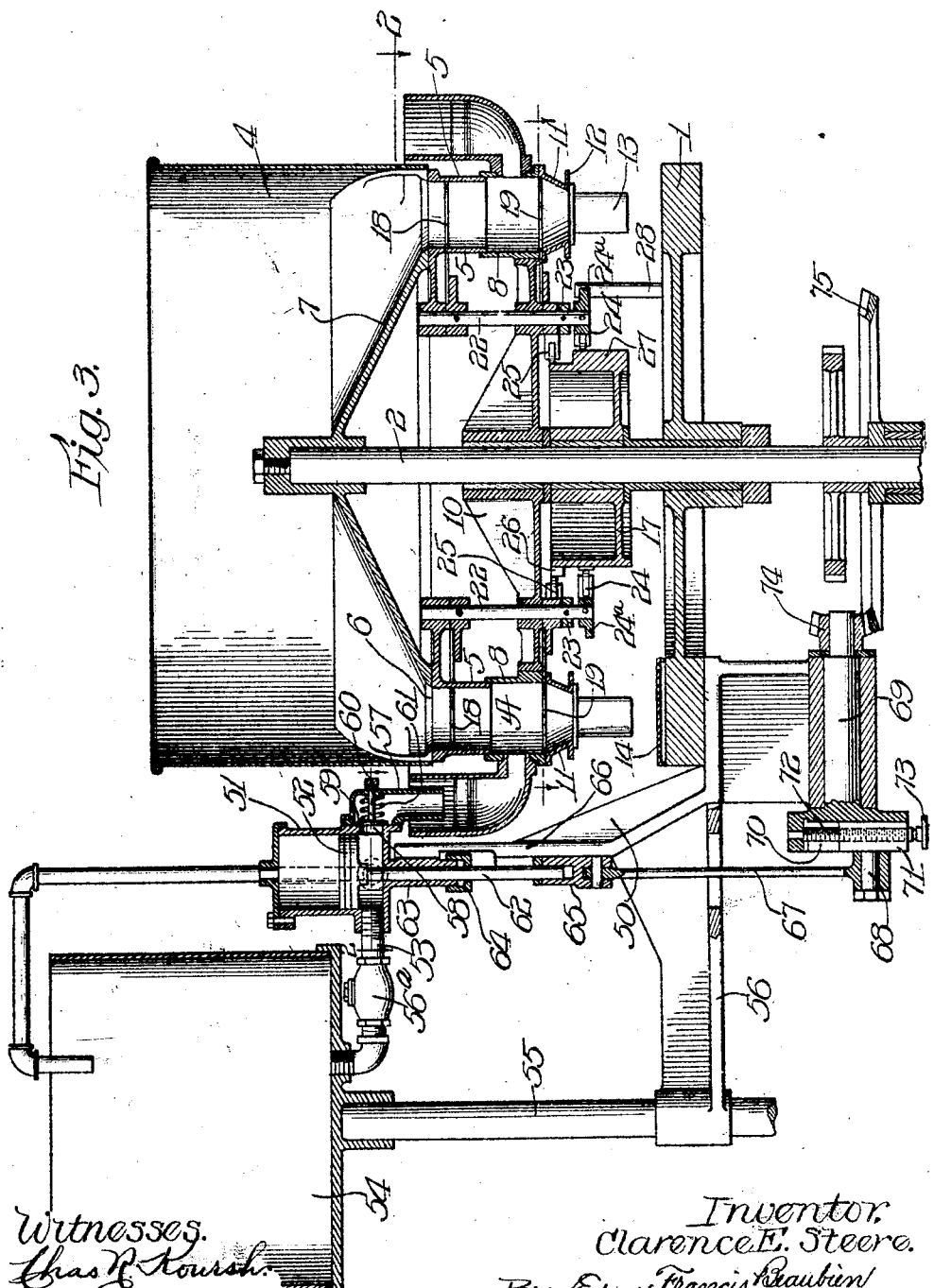

Patented Apr. 21, 1925.

1,534,035

UNITED STATES PATENT OFFICE.

CLARENCE E. STEERE, OF MILWAUKEE, WISCONSIN, ASSIGNOR, BY DIRECT AND MESNE ASSIGNMENTS, OF ONE-HALF TO SPRAGUE CANNING MACHINERY COMPANY, OF CHICAGO, ILLINOIS, A CORPORATION OF ILLINOIS, AND ONE-HALF TO AYARS MACHINE COMPANY, OF SALEM, NEW JERSEY, A CORPORATION OF NEW JERSEY.

LIQUID MEASURING AND FILLING MACHINE.

Application filed January 17, 1918. Serial No. 212,246.

*To all whom it may concern:*

Be it known that I, CLARENCE E. STEERE, a citizen of the United States of America, and resident of Milwaukee, Milwaukee County, Wisconsin, have invented a certain new and useful Improvement in Liquid Measuring and Filling Machines, of which the following is a specification.

My invention relates to can-filling machines, and my object is to provide an improved structure of this character which will be simple, durable and reliable in construction, and effective and efficient in operation.

Other objects of my invention will appear hereinafter.

My invention consists in the features of novelty exemplified by the construction, combination and arrangement of parts hereinafter described, shown in the accompanying drawings, and more particularly set forth in the appended claims.

In the accompanying drawings—

Fig. 1 is a view in elevation of an improved can-filling machine embodying my invention.

Fig. 2 is a plan view, partly in section, on the line 2—2 of Fig. 3.

Fig. 3 is a vertical section on the line 3—3 of Fig. 2.

Fig. 4 is an enlarged view, partly in section, on the line 4—4 of Fig. 2, of the can-controlled mechanism.

Fig. 5 is an enlarged detail section on the line 5—5 of Fig. 4.

In the drawings, I have illustrated my invention in connection with a bulk-filling machine of the type constituting the subject-matter of my co-pending application Serial No. 141,537, filed January 10, 1917. This machine is designed for filling cans, in a continuous operation, with measured quantities of bulk goods such as peas, the cans being arranged to successively enter the machine empty and leave it filled with measured quantities of material.

The bulk-filling machine shown in the drawings has a supporting frame provided with a flat topped table or platform 1 disposed horizontally and having a smooth flat top surface on which the cans are supported. Above this table is a rotary multiple filling head supported on and rotated by a central shaft 2. The shaft is vertically disposed and is mounted in suitable bearings in the frame. It is driven by any suitable means, not shown. One of the bearings for the shaft is vertically adjustable as set out in my said copending application for patent, which constitutes a vertical adjustment for the entire filling-head to adapt it to different size cans. The filling-head involves a rotary hopper 4 and a plurality of measuring devices A positioned beneath the hopper and rotating therewith. The hopper is cylindrical and has a series of upper measuring chamber sections 5 arranged in a circle adjacent its lower edge and equally spaced apart. These sections communicate directly with the hopper through the openings 6 which are preferably of the same diameter as the sections. The bottom of the hopper is formed into corresponding downwardly inclined chute portions 7 to insure the movement of the material to the openings of the sections 5. These sections telescope with corresponding lower chamber sections 8 which are mounted on a supporting spider member 10. This spider is mounted on the central shaft and is vertically adjustable to telescope the upper and lower chamber sections and thereby vary the capacity of the measuring chambers which are formed by said sections. The lower ends 11 of the lower sections are tapered to about the diameter of the open end of the smallest size can whereby to form discharge mouths for the measuring devices. These mouth-portions are provided with horizontal annular flanges 12 in the plane thereof which serves to cover the openings of larger cans to prevent splashing and slopping of the material. Each measuring unit has a depending curved pusher 13 which catches the can as it enters the machine and carries it around in proper relation to the filling unit. The can-supporting table has a slightly raised portion 14 extending partly around the path of the cans and which operates to raise the can slightly, this being provided for the purpose of attaching a can-controlled mechanism hereinafter described. This slightly raised portion terminates in the particular structure shown, at a point substantially where the filling operation ceases, although it may, if desired, extend entirely around the table. The cans successively enter the machine from a suitable feeding chute 15 positioned at one side thereof, and they leave at a point preferably more than half way around, where they are taken by a rotary table conveyer 16 to any suitable place. The rotary table overlaps the circular path of the cans and rotates in the opposite direction, so that as soon as the cans reach the surface of this table, they are carried away from the filling machine.

Beneath the spider member 10 is a large central stationary cam member 17 arranged to actuate the gates which control the material to and from the measuring chambers. There are two series of gates, each consisting of a plurality of individual gates. The upper series is associated with the upper chamber sections 5, and the lower series with the lower chamber sections 8. Each measuring chamber thus has an upper and a lower gate. The gates are in the form of flat thin blades or plates 18 and 19, which are arranged to operate in a horizontal plane. The gates enter narrow slots 20 in the walls of the chamber sections just large enough to admit them with sufficient clearance for proper operation. Each set of gates is carried with and is individual to its respective measuring chamber, and, furthermore, is independent of every other measuring unit and the gates thereof. The individual gates, however, are mounted to swing into and out of the measuring chamber to close and open it. Each upper gate is secured to the upper end of a vertical shaft 22 mounted in suitable bearings on the hopper body and in the spider 10, and each lower gate is mounted on a bushing 23 which is independently rotatable on the shaft 22. Thus each gate of the set is independent of the other. The lower ends of the shafts 22 have roller arms 24, and the bushings 23 have roller arms 25, both of which travel around the central cam member 17. The cam member has cam surfaces 26 and 27 which are engaged by the arms 24 and 25 to swing the gate to closed position. The lower arms 24 have short extensions 24ᵃ which engage a stationary pin 28 upstanding from the table for opening said upper gates. The lower gates have laterally outstanding fingers 30 which are rigidly secured thereto, and which project beyond the gates. These fingers are arranged to engage an upstanding relatively stationary arm 31 and swing the gates about their pivots to open position. In the case of both upper and lower gates, the opening operation is accomplished by the movement of the gates past said arm and pin respectively.

The cans, as before mentioned, are successively fed from the chute into the path of the pushers, which engage the cans, and carry them in proper relation to the filling devices. Shortly after the cans are thus positioned, the lower gates are successively opened by the upstanding arm 31, thereby dropping previously measured quantities of material in the measuring chamber directly into the cans. Just prior to the opening of the lower gates, however, the upper gates are successively closed by the central cam in order to close the passages from the hopper to the measuring chambers. The gates remain in this condition until they and the measuring chambers have travelled about a half revolution, whereupon the lower gates are successively closed by the central operating cam, and the upper gates are successively opened by the upstanding pin 28. During the remainder of the revolution of the filling head, the gates remain in this condition and the measuring chambers will be filled by material from the hopper.

In the present machine, the upstanding tripping arm 31 is mounted upon a rocking lever 35 which is pivoted at 36 in a bracket 37 on the machine frame, so that the rocking of this lever swings the upper end of arm 31 into and out of the path of the lower gate fingers. The lever is rocked by means of a control-member 38 which is mounted in an opening 39 in the frame table 1 and raised portion 14. This member is preferably in the form of a small rectangular plate pivoted at one end to swing into and out of the slot or opening 39.

This control member has a depending finger 40 which bears upon the broadened end portion of a short arm 41 of the lever 35 so as to actuate the lever 35. These parts are preferably so proportioned that the preponderence of weight is on the longer arm of the rocking lever, and this weight operates to restore the control member 38 and remove the arm 31 from the path of the gate fingers. The control member is normally maintained in the position whereby it projects above the surface of the raised portion 14 along which the cans travel, so that as the cans travel over this plate, they will depress it, actuate the rocking lever, and swing the tripping arm 31 into the path of the gate of the measuring device under which that particular can is positioned. In the event, however, that no can is in position beneath the measuring device, the tripping arm will not be thrown into actuating position, the lower gate will not be opened, and the quantity of material in the measuring device will be prevented from dropping onto the machine.

In a machine of this character, it is desirable not only to charge each can with a measured quantity of bulk or solid material, but also to charge it with a measured quantity of liquid material. This is particularly the case in connection with the canning of peas and beans, wherein, in addition to the peas or beans which are placed in the can, a quantity of brine or tomato sauce, as the case may be, is also placed in the can. In the present structure, I have provided mechanism by means of which a measured quantity of liquid may be introduced into the can during the same cycle of operation of filling the cans with the solid material. In the structure shown in the drawings, I provide an annular series of troughs or funnels 45 around the outside of the hopper in concentric relation thereto, and arranged to rotate with the hopper. These troughs are open at the top, and the bottom walls 46 which are inclined downwardly toward a middle point where they merge into a short pipe 47. These pipes open directly into the side walls of the lower chamber sections 8 through suitable openings therein. The pipes are provided with flanges 48 by means of which the funnels are bolted to the chamber sections. Each measuring chamber thus has a funnel associated therewith. The funnels are elongated horizontally, so that some considerable period of time may be consumed by the liquid in entering the funnels during the rotation of the structure. In practice, I preferably make each one of these funnels separate and secure their ends together, so that they will form an annulus surrounding the hopper, although each trough constitutes a separate compartment. It will be observed that when liquid is poured into the troughs, it must pass through the bulk measuring devices in order to enter the cans positioned below said measuring devices, and as a result the liquid washes the interior of the measuring chambers of any solid material which may happen to stick to the walls thereof. Thus each can will always receive all of the quantity of material measured therefor. The liquid is supplied to these troughs by means of a measuring device which operates periodically to discharge a measured quantity of liquid into each trough as it passes said measuring device. The measuring device in this particular structure comprises a pump positioned in a relatively fixed position with respect to the rotating troughs, and mounted upon a suitable bracket 50, on the frame of the machine. This pump comprises a cylinder 51 having a vertically reciprocating piston 52 therein. The lower end of the pump cylinder communicates by means of a pipe 53 with a reservoir 54 which contains a supply of liquid. This reservoir in this instance comprises a tank mounted upon a standard 55, supported by a bracket 56 on the machine frame. The pump is single acting, and is arranged so that upon each up-stroke of the piston 52, a quantity of liquid will be drawn through the pipe 53 into this pump cylinder; and upon each down-stroke of the pump, this liquid will be forced out of the pump cylinder into a passing trough. The pipe 53 contains a check-valve 56ª of any suitable type which operates to permit the flow of liquid from the reservoir to the cylinder when the pump piston is acting on its upstroke, but checks the flow in the reverse direction when the pump is acting on its down-stroke. A downwardly extending nozzle 57 is also connected with the lower end of the pump cylinder below the piston and constitutes an outlet for the liquid forced from the pump cylinder. This nozzle projects downwardly between the side walls of the annular series of troughs, and is arranged so that its lower end will just clear the division walls between the ends of contiguous troughs, and hence will not interfere with the rotation of said troughs. This nozzle has a check-valve which controls the outlet port 58 of the pump cylinder. This check-valve comprises a valve-member 59, having a stem 60, and a spring 61 acting on the valve-member to yieldingly seat it against said port and close the port against the entrance of air upon the upstroke of the pump. On the down-stroke of the pump, however, it permits the flow of liquid from the pump cylinder. It will thus be observed that the pump operates as a measuring device by taking into the cylinder, upon the up-stroke of the piston, a definite quantity of liquid from the reservoir. Upon the down-stroke of the piston, this measured quantity will be forced out of the cylinder and into a passing trough. It will also be observed that this measuring device may be very accurately regulated by varying the length of stroke of the piston in accordance with the quantity of liquid desired. The piston has a piston rod 62 extending downwardly through a suitable bearing 63, the lower end of which is closed by a suitable stuffing box 64 to prevent leakage. The piston rod at its lower end is connected to a cross head block 65 which reciprocates vertically in a suitable guideway 66 formed on the bracket 50. A connecting link 67 extends between the cross-head and the crank arm 68, this crank arm being mounted upon a horzontal shaft 69 supported in a suitable bearing in the machine frame. On the end of the shaft 69 is a disk having a diametrical slot 70 in its face, in which slot a sliding block 71 is mounted. This block 71 carries the crank arm 68. By shifting the block longitudinally of the slot, the eccentricity of the crank arm with respect to the center of the shaft may be varied to vary the length of stroke of the pump piston, and thereby vary the quantity of liquid which the pump measures at each operation. The block is shifted in the slot by means of a screw-threaded member 72, the outer end of which has a thumb-nut 73 by which it may be turned. The inner end of the shaft 69 carries a small bevel gear 74 which meshes with a correspondingly beveled larger gear 75 mounted upon and driven by the central upstanding shaft, whereby it will rotate in unison with the bulk measuring devices. These two gears 74 and 75 are so proportioned that in one complete rotation of the filling head, the pump will be driven through as many cycles of operation as there are bulk measuring devices in the bulk filling machine. In the present structure there are six measuring devices, and the gear ratio is such that the pump will perform six measuring and discharging operations. The gears 74 and 75 are preferably in constant engagement, but they are so timed with respect to each other that the liquid measuring pump will start on its down-stroke shortly after the forward end of the corresponding trough passes the nozzle 57, whereby the discharge of liquid therefrom may occupy substantially the period of time required for the length of the trough to pass the nozzle. Because of this construction, the machine may be run at high speed without splashing and wasting the liquid. It will be noted also that the lower gates are not closed for a considerable period of time after the liquid has been discharged into the troughs, and in consequence the troughs have plenty of time to drain, thus guarding against wasteful dripping after the filled cans have been discharged from the machine. In the event that one or more of the measuring devices misses a can in passing the feeding chute, it is desirable to prevent the liquid being discharged from the pump into the open measuring devices. I utilize the can-controlled mechanism hereinbefore described for controlling the discharge of liquid from the measuring pump. The stem 60 of the discharge check-valve outside the nozzle wall is in position to engage a small bail 75 adapted to be swung vertically into and out of the path of the valve stem. This bail is pivotally mounted at 76 on the nozzle and has an arm 77 pivotally connected to a downwardly extending link 78. The lower end of the link is pivotally connected to one arm of a lever 79 which is pivoted on a bracket 80 outstanding from the machine table. The other arm of the lever 79 is pivotally connected to the long arm of the lever 41. The parts are so arranged that normally the bail is in position to lock the check-valve against opening, but when the can actuates the control-plate hereinbefore described, this bail will, through the linkage just mentioned, swing the bail upwardly and unlock the check-valve and permit the check-valve to operate under the pressure created by the pump. The pump operates upon each cycle to measure and discharge liquid, although the liquid will not be discharged into the troughs unless a can is in position to receive the liquid. However, in order to relieve the pump whenever there is no can to receive the liquid, I provide a by-pass consisting of a pipe 81 leading from the lower end of the pump cylinder back to the reservoir 54. This pipe contains a check-valve 82, the spring 83 of which is considerably stronger than the spring 61 of the discharge check-valve, so that a somewhat greater degree of pressure is required to open said by-pass valve. By differentially arranging the two check-valves in this manner, the by-pass check-valve will remain closed whenever the control mechanism unlocks the discharge check-valve and permits it to operate. If, however, the discharge valve is locked, the increased pressure created by the pump will open the by-pass valve and permit the liquid to be returned to the reservoir.

I claim:—

1. A filling machine, including a series of moving measuring chambers, means for supporting and moving cans thereunder, means for supplying bulk material to the measuring chambers for discharge into cans thereunder, a series of troughs movable with the measuring chambers, and means for supplying liquid to said troughs said troughs being in communication with said chambers and delivering liquid thereto.

2. A filling machine, including a series of moving measuring chambers, means for supporting and moving cans thereunder, means for supplying bulk material to the measuring chambers for discharge into cans thereunder, a series of troughs movable with the measuring chambers and communicating therewith, and means for supplying liquid to said troughs, said last named means being operable subsequent to operation of the means for supplying bulk material to the measuring chambers whereby the liquid from the troughs flushes the measuring chambers.

3. A filling machine, including a series of moving measuring chambers, means for supporting and moving cans thereunder, means for supplying bulk material to the measuring chambers for discharge into cans thereunder, a series of troughs movable with the measuring chambers, a source of liquid supply adjacent the path of movement of the troughs, and means for discharging measured charges of liquid into the troughs said troughs being in communication with said chambers and delivering liquid thereto.

4. A filling machine, including a rotating series of measuring chambers, means for supporting and moving the cans under the chambers, a hopper mounted above and rotating with the measuring chambers, valve mechanism controlling the flow of bulk material from the hopper to the measuring chambers and from said chambers to cans thereunder, an annular series of troughs disposed about and rotatable with the series of measuring chambers and each communicating with a respective measuring chamber, and means for supplying measuring charges of liquid to said troughs.

5. A filling machine, including a rotating series of measuring chambers, means for supporting and moving the cans under the chambers, a hopper mounted above and rotating with the measuring chambers, valve mechanism controlling the flow of bulk material from the hopper to the measuring chambers and from said chambers to cans thereunder, an annular series of troughs disposed about and rotatable with the series of measuring chambers and each communicating with a respective measuring chamber, a stationary source of liquid supply, and measuring mechanism for delivering liquid from said source in measured batches to the troughs.

6. A can filling machine, including a can supporting table, an annular series of filling cylinders rotatable above the table and vertically adjustable with respect thereto, an annular series of troughs elongated circumferentially of the series and having the ends of their mouth portions connected, and means including a stationary source of supply for discharging measured batches of liquid into said troughs.

7. A can filling machine, including a can supporting table, an annular series of filling cylinders rotatable above the table and vertically adjustable with respect thereto, an annular series of troughs elongated circumferentially of the source and having the ends of their mouth portions connected, the side peripheral walls of the troughs being extended thereabove to define an annular channelway above the trough, and means including a stationary source of supply and a spout depending into said channelway for supplying measured batches of liquid to the troughs.

8. A can filling machine including a series of moving troughs, means for supporting cans to receive discharge from the troughs and for moving said cans therewith, a pump cylinder, a duct extending from said cylinder for discharge into the troughs, a source of liquid supply, a duct connecting said source with the pump cylinder, a check valve in the last named duct, a return duct extending from the cylinder and communicating with the source of supply, a valve yieldable upon pressure to permit flow of liquid through the trough duct, a valve yieldable upon relatively greater pressure to permit flow of fluid to the return duct, a piston reciprocable in the cylinder, and means controlled by movement of cans for permitting operation of the trough duct valve.

Signed by me at Chicago, Ill., this 12th day of June, 1917.

CLARENCE E. STEERE.